May 17, 1955  G. D. GOSWICK  2,708,315
TIMBER STUD MARKER
Filed July 6, 1953  2 Sheets-Sheet 1

INVENTOR
George D. Goswick

BY Mason, Fenwick & Lawrence
ATTORNEYS

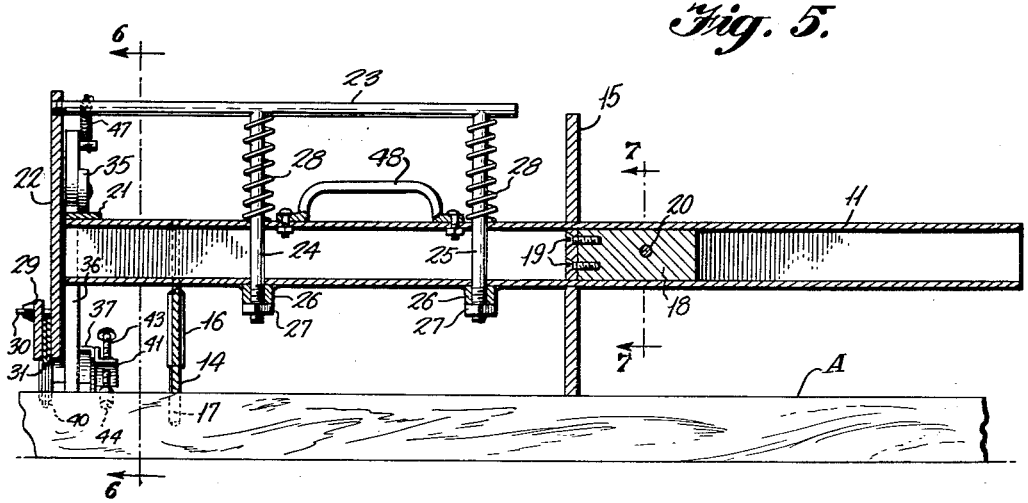
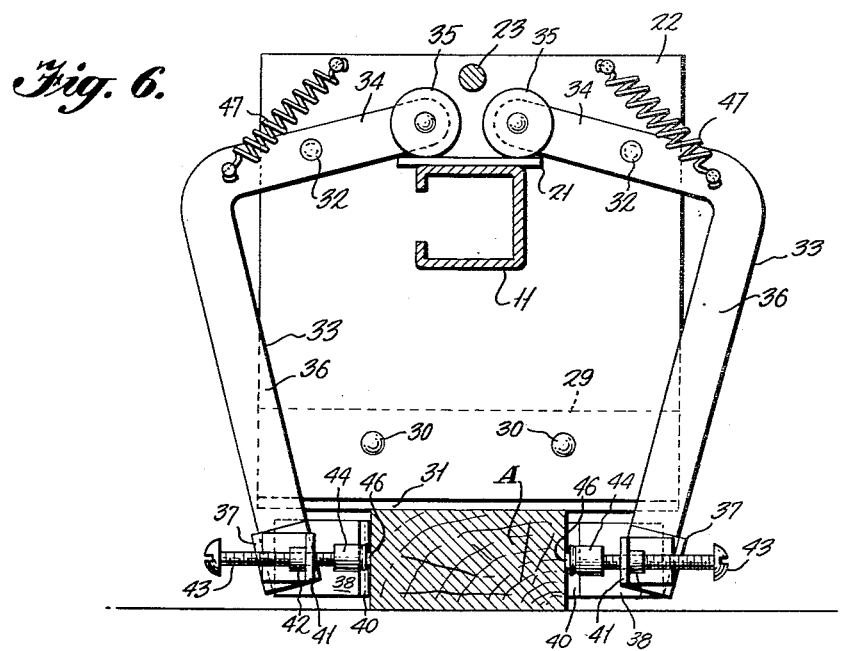
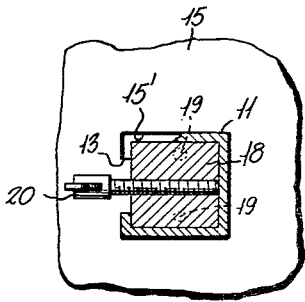

United States Patent Office 2,708,315
Patented May 17, 1955

2,708,315

TIMBER STUD MARKER

George D. Goswick, Cumming, Ga.

Application July 6, 1953, Serial No. 366,313

5 Claims. (Cl. 33—34)

The present invention relates in general to devices for marking lengths of lumber, and more particularly to devices for marking cut lines and identifying indicia on timber studs at appropriate points to form the various framing members used in building construction.

An object of the present invention is the provision of a novel marking device facilitating the measurement and marking of timber studs in a novel, convenient and expeditious manner.

Another object of the present invention is the provision of a novel device for marking cut lines and identifying indicia on timber studs to be used in erecting building frames, characterized by accuracy and ease of measurement, and convenience in handling and operation.

Another object of the present invention is the provision of a novel marking device for measuring and marking building frame studs, by which location or cut lines may be conveniently marked off at measured lengths along the studs appropriate for vertical framing studs, window and door framing members, and the like, and indicia indicating the nature of the mark may be simultaneously imprinted on the stud.

Other objects, advantages and capabilities of the invention will become apparent from the following detailed description, taken in conjunction with the accompanying drawings, showing only a preferred embodiment of the invention.

In the drawings:

Figure 5 is a vertical longitudinal section view of the device taken along the lines 5—5 of Figure 3;

Figure 6 is a detail view of the marker arm supporting plate and associated components viewed from lines 6—6 of Figure 5; and Figure 7 is a vertical transverse section view of the adjustable plate mounting components, taken along the lines 7—7 of Figure 5.

Figure 1:
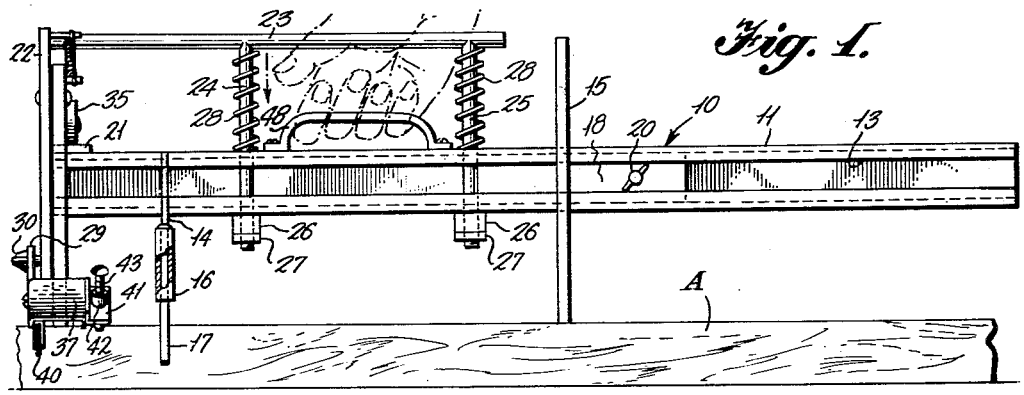
Figure 1 is a side elevation of a timber stud marking device embodying the present invention.
Figure 2:
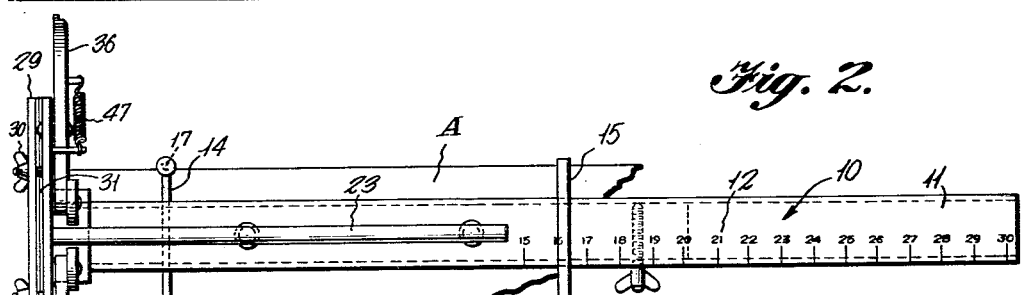
Figure 2 is a top plan view of the timber stud marking device.

Referring to the drawings, wherein like reference characters designate corresponding parts throughout the several figures, the timber stud marking device, indicated generally by the reference character 10, is formed about an elongated mounting bar 11 preferably formed of a channel iron or like member having scale markings 12 laid off in inches etched or otherwise formed in the upwardly facing wall of the channel iron and a slot 13 in one side of the channel iron extending the entire length thereof.

Figure 3:
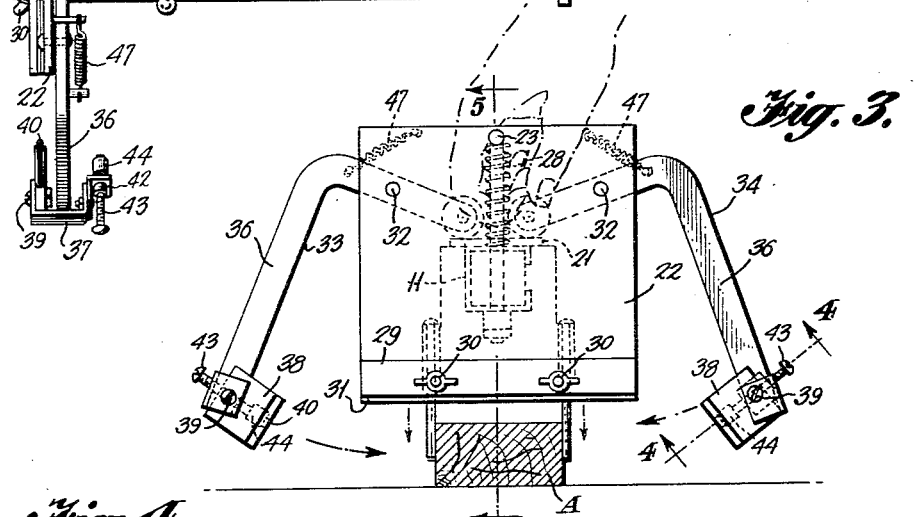
Figure 3 is an end elevation of the device, shown in marking position on a timber stud.
Figure 4:
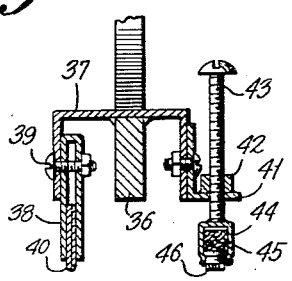
Figure 4 is a transverse section view of one group of marking pad supporting components, taken along the lines 4—4 of Figure 3.

To support the elongated mounting bar 11 on a wood framing member, such as the 2 x 4 framing stud A illustrated in Figures 1, 3, 5 and 6, the mounting bar is provided with a pair of transverse downwardly projecting supporting plates 14 and 15. The supporting plate 14 is preferably welded or otherwise fixed in a secure manner to the mounting bar 11 near one end thereof.

The lower edge of the transverse fixed supporting plate 14 is designed to rest on the upper edge of the framing stud, and the plate is preferably provided with tubular sleeves 16 welded or otherwise formed on the lateral edges thereof and slidably elongated bolts 17 adapted to normally project below the lower edge of the plate 14 along the sides of the timber stud.

The supporting plate 15 is preferably adjustably positioned lengthwise of the mounting bar. This may be accomplished by providing a supporting block 18 of wood or other suitable material having cross sectional dimensions appropriate to slidably fit within the channel of the mounting bar 11. The supporting plate 15 is provided with a C-shaped slot 15' complementary to the channel iron member forming the mounting bar 11, which is adapted to be fitted over the mounting bar 11 and provide a portion within the mounting bar secured to the guide block 18 by means of suitable screws 19. A suitable wing nut 20 is preferably threaded on a horizontal transverse axis through the guide block 18, serving as a set screw to fix the plate 15 at any desired position of adjustment.

A flat transverse horizontally disposed plate 21 is welded or otherwise secured to the top surface of the mounting bar 11 at the forward end thereof, serving as a roller guide surface for pivoted arms to be later described. A vertically movable vertical transverse rectangular plate 22 is disposed outwardly of the forward end of the mounting bar 11 and is supported therefrom by means of a horizontal bar 23 rigidly fixed thereto and overlying the top of the mounting bar 11, the supporting rod 23 having integral parallel downwardly projecting arms 24, 25, extending through aligned apertures in the upper and lower walls of the mounting bar 11 and tubular collars 26 fixed to the mounting bar 11, nuts 27 being threaded on the lower end of the arms 24, 25, to limit the upward movement of the arms. Suitable coil springs 28 surround the arms 24, 25, between and bearing against the supporting rod 23 and the top wall of the mounting bar 11, to resiliently urge the supporting rod 23 and plate 22 to its uppermost limit of travel.

A transverse clamping plate 29 is adjustably secured along the bottom edge of the plate 22 to the plate 22 by means of screws and wing nuts 30 to adjustably clamp therebetween a folded pad of felt or other suitable material 31 serving as an inking pad to imprint a transverse line across the top surface of the timber stud A when the lower folded edge of the pad 31 is brought into contact therewith.

Pivotally mounted on the plate 22 on pivot pins 32 is a pair of identical but oppositely arranged bell crank arms 33 having an upper arm 34 connected to the pivot 32 with its inner end overlying the roller guide plate 21 and supporting a roller 35 in contact therewith, and a lower arm 36 projecting downwardly below the lower edge of the plate 22. The lower arms 36 of the bell crank arms 33 support a pair of markers on a transversely disposed U-shaped plate 37 welded or otherwise suitably fixed to the arm 36. To the outermost flange of the U-shaped plate 37, a U-shaped pad holder 38 is secured by a screw and bolt 39, adapted to receive between its flanges a folded ink pad 40 of felt or other material, the holder 38 being inclined relative to the arm 36 so that the entire folded edge of the pad 40 will contact the adjacent side of the timber stud A when the bell crank arm 33 is pivoted toward the stud and imprint a vertical mark thereon. The other flange of the U-shaped plate 37 supports a pivotally adjustable bracket 41 having a threaded collar 42 fixed thereon and receiving a screw 43 or other threaded supporting rod, to the lower end of which a cup 44 is fixed to house a cylindrical ink holding pad 45. The lips of the cup 44 are deformed inwardly and adapted to resiliently receive any one of a set of marker buttons 46 porous to marking ink and having a type face representing selected letters or symbols, for example the letters S symbolizing stud; W symbolizing window; D symbolizing door; and like indicia.

A suitable coil spring 47 is provided with one end coupled to the upper arm 34 of the bell crank arm 33 outwardly of the pivot 32 therefor and the other end fixed to the marker plate 22 inwardly of the pivots 32, to continuously urge the lower end of the bell crank arm 33 outwardly and maintain the rollers 35 in contact with roller guide plate 21.

Preferably, a handle 48 is fixedly mounted to the upper wall of the mounting bar 11 and projects upwardly therefrom between the guide arms 24 and 25, to form a convenient member through which the fingers can be inserted to squeeze the marker plate supporting rod 23 downwardly toward the mounting bar 11 against the bias of the coil springs 28.

Operation of the device is substantially as follows: Assuming the operator desires to mark off on a horizontal base plate framing stud the locations of vertical framing studs spaced sixteen inches on center, the operator would loosen the wing nut 20 and slide the adjustable supporting plate 15 along the mounting bar 11 until the plate is in alignment with the sixteen inch scale markings 12 on the upper wall of the mounting bar, and tighten the wing nut 20 to hold the plate 15 at this position of adjustment. The lower edges of the supporting plates 14 and 15 are then rested on the upper surface of the base plate stud A with the bolts 17 lying along each side of the stud and the plate 15 lying over a suitable starting reference mark on the base plate stud. If the marker plate supporting rod 23 is then squeezed downwardly toward the mounting bar 11 in the manner indicated in Figure 1, the roller guide plate 21 and mounting bar 11 change position relative to the marker plate 22, thus camming the ends of the bell crank arms 33 supporting the rollers 35 upwardly about the pivots 32 to a position approximating that illustrated in Figure 6, and bringing the marker pads 40 and marker buttons 46 into contact with the sides of the stud A to imprint vertical lines at the proper point for the vertical stud on the sides of the stud A and imprinting a letter, in this instance the letter S, inwardly of this marker line. Simultaneously, since the lower edge of the marker plate 22 was carried downwardly by the relative motion between the marker plate supporting rod 23 and the mounting bar 11, the mounting bar 11 remaining fixed with the plates 14 and 15 in contact with the stud A, the marker pad 31 is also brought into contact with the upper surface of the base plate stud A in transverse alignment with the lateral marker pads 40 to imprint a transverse line on the upper face of the stud. It will be apparent that this procedure can be repeated with great convenience, accuracy, and saving of time by stepping the device along the base plate stud A with the adjustable plate 15 each time placed in registry with the mark made during the preceding operation by the marker pad 31.

The device is useful not only in marking off the location of other framing members, but in marking cut lines along framing studs, such for example as for doors, windows, and like wall openings. In such instances, different marker buttons 46 would be removably inserted in the cup 45, a button for example having the letter W being inserted to indicate a cut line for a window opening and a marker button having the letter D for indicating the cut line for a door opening.

While but one particular embodiment of the invention has been particularly shown and described, it is apparent that various modifications may be made in the invention without departing from the spirit and scope thereof, and it is desired, therefore, that only such limitations shall be placed thereon as are imposed by the prior art and are set forth in the appended claims.

What is claimed is:

1. A timber stud marker for imprinting cut and location lines at selected points along wood framing studs and the like comprising an elongated mounting bar, means projecting from said bar at spaced points adapted to rest on a framing stud, a supporting member disposed adjacent one end of said bar, means slidably mounting said supporting member on said bar for rectilinear movement perpendicular to the axis of said bar, means resiliently biasing said supporting member away from the axis of said bar, line-imprinting means on said supporting member positioned to be engaged with a surface of the framing stud when said supporting member is shifted toward the axis of said bar, arm means pivotally mounted on said supporting member having line-imprinting means on one end thereof, and interengaging means on said arm means and said bar to pivot said one end of said arm means inwardly and bring the line-imprinting means thereon into contact with another surface of the stud in right angular relation to said first mentioned imprinting means during said movement of said supporting member toward the axis of said bar.

2. A timber stud marker for imprinting lines and identifying indicia at selected points along wood framing studs and the like comprising an elongated mounting bar, means projecting from said bar at spaced points therealong adapted to rest on a framing stud, a supporting panel disposed perpendicular to the axis of said bar, means slidably mounting said panel on said bar for rectilinear movement perpendicular to the axis of said bar, means resiliently biasing said panel away from said bar, line-imprinting means on the lowermost portion of said supporting panel adapted to be engaged with a surface of the framing stud when said panel is shifted toward said bar against the bias of said resilient means, a pair of arms pivotally mounted on said panel for converging and diverging movement, said arms each having line-imprinting means on one end thereof, means resiliently biasing said arms to a diverged condition, and interengaging means on said arms and said bar to converge said ends of said arms during movement of said supporting panel toward said bar and bring the line-imprinting means on said arms into contact with opposite surfaces of the stud in right angular relation to said first mentioned imprinting means.

3. In a timber stud marker, the combination recited in claim 2 wherein said elongated mounting bar comprises a C-shaped channel member having a scale on one wall thereof and an elongated slot extending the length thereof, and wherein said rest means projecting from said bar includes a panel disposed in a plane perpendicular to the axis of said bar and surrounding the same having a guide block affixed thereto and slidably disposed within the channel of said elongated mounting bar, and set screw means threaded in said block and projecting through said slot adapted to frictionally lock said block at selected positions of adjustment along said mounting bar.

4. A timber stud marker for imprinting lines and identifying indicia at selected points along wood framing studs and the like comprising an elongated mounting bar having laterally projecting shoulder means at one end thereof, means projecting from said bar at spaced points adapted to rest on a framing stud, a rectangular supporting panel disposed in a plane perpendicular to the axis of said bar and having a projecting arm overlying a portion of said bar, means slidably mounting said projecting arm on said bar for rectilinear movement toward and away from the same, means resiliently biasing said projecting arm away from said bar, a line-imprinting pad mounted on said supporting panel adjacent the lower edge thereof and projecting therefrom to be engaged with a surface of the framing stud when said panel and projecting arm are shifted toward said bar, a pair of bell crank arms pivotally supported on said panel, each having contact rollers on the upper end thereof and an imprinting assembly including a line-imprinting pad and an indicia imprinting pad disposed inwardly thereof mounted on the lower end of said arms, the line-imprinting pads on said arms being positioned to imprint lines in vertical coplanar relation with said first mentioned imprinting pad and at right angles thereto, and means resiliently biasing the rollers on said arms into continuous contact with said projecting shoulder means on said bar whereby the arms are pivoted during relative movement between said panel and said bar on movement of said panel toward said bar to bring said imprinting means on said arms into contact with opposite lateral surfaces of the stud upon which the marker is resting.

5. In a timber stud marker, the combination recited in claim 4 wherein said elongated mounting bar comprises a C-shaped channel member having a scale on one wall thereof and an elongated slot extending the length thereof, and wherein said rest means projecting from said bar includes a panel disposed in a plane perpendicular to the axis of said bar and surrounding the same having a guide block affixed thereto and slidably disposed within the channel of said elongated mounting bar, and set screw means threaded in said block and projecting through said slot adapted to frictionally lock said block at selected positions of adjustment along said mounting bar.

References Cited in the file of this patent

UNITED STATES PATENTS

| | | |
|---|---|---|
| 421,746 | Mooney | Feb. 18, 1890 |
| 666,680 | Kroke | Jan. 29, 1901 |
| 878,605 | Broadley | Feb. 11, 1908 |

FOREIGN PATENTS

| | | |
|---|---|---|
| 84,781 | Switzerland | Apr. 16, 1920 |